US012146643B2

(12) United States Patent
Munoz et al.

(10) Patent No.: US 12,146,643 B2
(45) Date of Patent: Nov. 19, 2024

(54) DYNAMICALLY ADJUSTING AN INFRASTRUCTURE ITEM

(71) Applicant: Intel Corporation, Santa Clara, CA (US)

(72) Inventors: Juan Munoz, Folsom, CA (US); Ignacio Javier Alvarez Martinez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 821 days.

(21) Appl. No.: 17/129,551

(22) Filed: Dec. 21, 2020

(65) Prior Publication Data

US 2021/0107398 A1  Apr. 15, 2021

(51) Int. Cl.
| | |
|---|---|
| *G06V 20/56* | (2022.01) |
| *B60Q 1/14* | (2006.01) |
| *B60W 60/00* | (2020.01) |
| *F21V 23/04* | (2006.01) |
| *G06V 10/141* | (2022.01) |
| *G06V 10/98* | (2022.01) |

(52) U.S. Cl.
CPC ........ *F21V 23/0464* (2013.01); *B60Q 1/1423* (2013.01); *B60Q 1/1438* (2013.01); *B60W 60/001* (2020.02); *G06V 10/141* (2022.01); *G06V 10/993* (2022.01); *G06V 20/56* (2022.01); *B60W 2420/40* (2013.01)

(58) Field of Classification Search
CPC . B60Q 1/1423; B60Q 1/1438; B60W 60/001; B06V 20/56; B06V 10/001; B06V 10/993

USPC ........................................................ 362/466
See application file for complete search history.

(56) References Cited

U.S. PATENT DOCUMENTS

| | | | | |
|---|---|---|---|---|
| 2012/0074842 | A1* | 3/2012 | Hattori | B60Q 1/1423 |
| | | | | 315/76 |
| 2014/0232566 | A1* | 8/2014 | Mimeault | G01S 17/88 |
| | | | | 340/936 |
| 2016/0247394 | A1* | 8/2016 | Stenneth | G07C 5/0808 |
| 2017/0023945 | A1* | 1/2017 | Cavalcanti | G08G 1/04 |
| 2018/0020527 | A1 | 1/2018 | Nolan et al. | |
| 2018/0056851 | A1* | 3/2018 | Kim | B60Q 1/507 |

(Continued)

OTHER PUBLICATIONS

"European Application Serial No. 21198454.7, Response filed Dec. 19, 2022 to Extended European Search Report mailed Mar. 22, 2022", 9 pgs.

(Continued)

*Primary Examiner* — Christopher M Raabe
(74) *Attorney, Agent, or Firm* — Schwegman Lundberg & Woessner, P.A.

(57) ABSTRACT

Disclosure herein are systems and methods for dynamically adjusting infrastructure items, such as street lights, construction signage, and/or other lighting elements. The systems and methods may include receiving environmental data for a sector containing the infrastructure items. A quality of infrastructure effectors located within the sector may be determined. A deviation from a standard infrastructure quality associated with the infrastructure effectors may be determined. A setting of the infrastructure items located in the sector may be changed to minimize the deviation from the standard infrastructure quality.

23 Claims, 4 Drawing Sheets

(56) References Cited

U.S. PATENT DOCUMENTS

2019/0197882 A1* 6/2019 Camras .................. F21V 23/04

OTHER PUBLICATIONS

"European Application Serial No. 21198454.7, Extended European Search Report mailed Mar. 22, 2022", 10 pgs.
"European Application Serial No. 21198454.7, Communication Pursuant to Article 94(3) EPC mailed Aug. 1, 2023", 9 pgs.

* cited by examiner

DYNAMICALLY ADJUSTING AN INFRASTRUCTURE ITEM

FIELD OF THE DISCLOSURE

The present subject matter relates to infrastructure and autonomous systems. Specifically, the present disclosure relates to dynamically adjusting infrastructure used by autonomous vehicles.

BACKGROUND

Autonomous vehicles have been developed to automate, adapt, or enhance vehicle systems to increase safety and provide better driving. In such systems, safety features are designed to avoid collisions and accidents by offering technologies that alert the driver to potential problems, or to avoid collisions by implementing safeguards and allowing drivers to take over control of the vehicle. Autonomous vehicles rely on various sensors that are able to detect objects and other aspects of their operating environment.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Autonomous vehicles may confront several challenges when deployed. The various algorithms that control autonomous vehicles may use visual data from onboard cameras and/or other sensors to localize and/or to detect objects on the road, such as other vehicles and/or pedestrians, and their surroundings, such as guard rails, curbs, signs, etc. The algorithms may make attempts to compensate for changes in the appearance of the environment, such as, for example, compensating for shadows caused by other vehicles and/or objects. Some challenges, for example, variations in illumination at night and/or changes in weather conditions, such as, for example, changes from sunny to cloudy conditions, may cause system failures and/or other problems. Algorithms may attempt to mitigate these sudden changes in appearance. As disclosed herein, sky blackening algorithms or other algorithm types, may use image analysis of current images in conjunction with past images and/or known images to compensate for atmospheric conditions such as cloudy skies.

As disclosed herein, changes in lighting conditions may be tackled by dynamically adjusting the infrastructure surrounding roads during hours of poor natural illumination. The systems and methods disclosed herein may provide a range of illumination that may optimize the performance of autonomous vehicles. For example, the light intensity (e.g., lumens per square meter, or lux) produced by infrastructure, such as streetlights, may be dynamically adjusted to provide optimized lighting conditions for autonomous vehicles. Other non-limiting examples include dynamically adjusting the focus and/or direction of lighting elements to better illuminate roads, paths, etc.

The systems and methods disclosed herein also allow for overall improvement of infrastructure systems by allowing for better control of energy usage, minimize light pollution, while at the same time delivering optimized conditions for autonomous vehicles. The optimized conditions improve the overall system by minimizing risks associated with potential collisions during fully autonomous operations. During driver assisted autonomous operations system improvements may be recognized by reducing driver fatigue and errors caused by suboptimal lighting conditions.

The dynamic adjustment of infrastructure as disclosed herein represents an improvement to previous solutions that focused on improving the performance of autonomous vehicles by innovating on their hardware or perception algorithms. Stated another way, instead of optimizing environmental conditions, previous solutions attempted to improve the sensors and algorithms used in autonomous vehicles to detect the changes in environmental conditions. The systems and methods disclosed herein may be utilized in conjunction with or without the improved onboard sensors and algorithms of autonomous vehicles to achieve greater efficiency and overall system improvements resulting in lower accident rates caused by changes in environmental conditions.

The systems and methods disclosed herein may utilize smart infrastructure. The smart infrastructure may change and adapt dynamically to improve the performance of autonomous vehicles. For instance, the systems and methods disclosed herein may allow sensors in cities to collect environmental data that may be used to dynamically adjust lighting conditions to improve autonomous vehicle navigation on streets. For example, lighting improvements in locations, sometimes called sectors, may result in improvements in autonomous vehicle navigation and/or object detection capabilities. An additional improvement may be reduction in required redundancy/performance requirements on vehicles at the expense of infrastructure.

The above discussion is intended to provide an overview of subject matter of the present patent application. It is not intended to provide an exclusive or exhaustive explanation of the disclosure. The description below is included to provide further information about the present disclosure.

Figure 1:
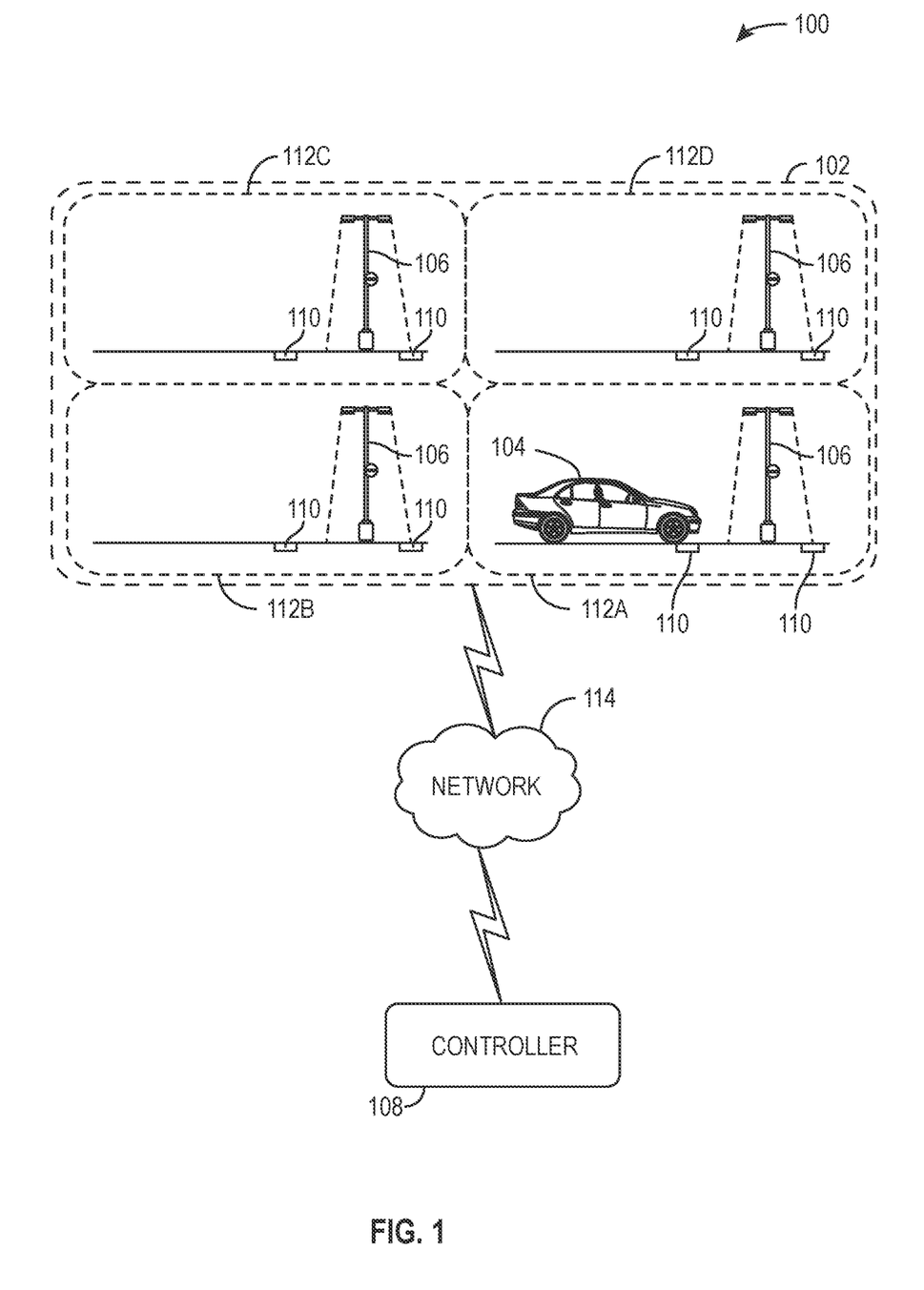
FIG. 1 illustrates an example environment for dynamically adjusting infrastructure in accordance with at least one example of this disclosure.

Turning now to the figures, FIG. 1 shows an example environment 100 for dynamically adjusting infrastructure in accordance with at least one example of this disclosure. As shown in FIG. 1, environment 100 may include area 102, an autonomous vehicle 104, an infrastructure items 106, a controller 108, and sensors 110.

Area 102 may be a city, county, state/province, or country. Area 102 may be divided into one or more sectors 112 (labeled individually as sectors 112A, 112B, 112C, and 112D). Examples of sectors 112 can include states/provinces of a country, counties and/or cities of a state/province, blocks within a city, particular zip/postal codes within an area, etc.

Sectors 112 can include infrastructure items 106. A single infrastructure item 106 is shown in each of sectors 112 for clarity, but sectors 112 may have a plurality of infrastructure items 106. The various infrastructure items 106 may be of differing types as well. Infrastructure items may be any hardware or software element that is disposed within any environment Which may or may comprise sensors. For example, infrastructure items 106 may be streetlights as shown in FIG. 1 or any type of illumination device that may be located within sectors 112. For example, infrastructure items 106 may be an overhead streetlight as shown in FIG. 1, inground lighting such as curb lighting, traffic lights, construction lighting, lighted signage, etc.

Sectors 112 may include any number of sensors 110, Two sensors 110 are shown in each of sectors 112 for clarity. Sensors 110 may be a component of infrastructure items 106. For example, sensors 110 may be photocells that are components of streetlights. Sensors 110 may also be separate from infrastructure items 106. For instance, sensors 110 may be photocells and/or moisture sensors embedded in a road and/or in a guardrail positioned proximate the road.

Sensors 110 may be associated with a single infrastructure item, such as a streetlight, or with multiple infrastructure items. For example, a single sensor or a collection of sensors may be associated with a single streetlight or a plurality of streetlights to measure a general illumination of an area. For instance, a first set of sensors may be used to measure a general illumination of a first block of a city illuminated by a first set of streetlights. A second set of sensors may be used to measure a general illumination of a second block of a city illuminated by a second set of streetlights.

As shown in FIG. 1, both infrastructure items 106 and sensors 110 may be in electrical communication with controller 108. This connection may be wired or wireless network 114. Autonomous vehicle 104 may also be in electrical communication with controller 108 via a wireless connection that utilizes network 114.

The sensors 110 can transmit one or more signals to controller 108 that correspond to environmental data. Controller 108 can use the signals to determine a quality of one or more infrastructure effectors. Infrastructure effectors effectuates the infrastructure items. Infrastructure effectors may include a control system and/or other feature of an infrastructure item that may be changed by an outside command and/or entity. The various infrastructure effectors may allow for infrastructure effector measurements to be made from the infrastructure items. As an example, infrastructure effectors measurements may include lighting values, moisture levels, etc. For example, controller 108 may continuously monitor and receive signals from sensors 110. Using the signals, controller 108 may determine an illumination value for streetlights in sector 112A. For instance, controller 108 may convert the signals to lumens and/or a lux value using calibration formulas and/or lookup tables. Further using the signals, controller 108 may actuate switches, relays, rheostats, etc. of infrastructure item 106 to increase or decrease illumination as disclosed herein.

Controller 108 may store in a memory an infrastructure quality associated with autonomous vehicle 104. The infrastructure quality standard may be initially received from autonomous vehicle 104. The infrastructure quality standard may also be a regulatory standard set by a governing body. For example, a regulatory body and/or the manufacture of autonomous vehicle 104 may publish a minimum illumination level in which autonomous vehicle 104 is permitted to operate in a fully autonomous mode. The infrastructure quality standard may also include tiers for different levels of autonomous operations. For instance, for fully autonomous operations, an illumination of X lux may be specified. For driver assisted autonomous operations an illumination of Y lux may be specified, where Y is less than X. For illumination values below Y, autonomous operations may be prohibited.

The infrastructure quality standard may be an average of infrastructure qualities received by controller 108 from a plurality of autonomous vehicles. For example, different autonomous vehicles may have different sensors and/or generational algorithms used to control the vehicles. As a result, each of the autonomous vehicles may require a different illumination level in order to operate in various states of autonomous operations. For instance, a newer model vehicle may require less illumination for fully autonomous operations due to being equipped with newer sensors and/or algorithms than an older model vehicle that may have less sensitive sensors and/or older algorithms.

Each of the autonomous vehicles 104 may transmit infrastructure qualities as illumination levels it requires for various degrees of autonomous operations. Controller 108 may combine the various infrastructure qualities to arrive at a standard infrastructure quality. The combination of the various infrastructure qualities may be an average of the illumination values for each of the vehicle. The standard infrastructure quality may be a weighted average of the various illumination values. For example, lower illumination values received may be given a greater weight when determining the standard infrastructure quality to allow controller 108 to dynamically adjust infrastructure items 106 to accommodate more vehicles.

Once the infrastructure quality and standard infrastructure quality are determined, controller 108 may determine a deviation of the infrastructure quality from the standard infrastructure quality. For example, if the infrastructure quality as determined using environmental data is equal to W lux and the standard infrastructure quality as determined from data received from the autonomous vehicles, a regulatory body, etc. is Z lux the deviations may be equal to W minus Z.

After determining the deviation, controller 108 may change a setting of infrastructure item 106 to minimize the deviation from the standard infrastructure quality. For example, if the illumination of sector 112A is below the standard infrastructure quality (i.e., W−Z<0), then controller 108 may increase an intensity of light emitted by infrastructure item 106 to decrease the deviation. If the illumination of sector 112A is too bright (i.e., W−Z>0), then controller 108 may decrease the intensity of light emitted by infrastructure item 106 to conserve energy, decrease light pollution, and minimize a risk of light oversaturating onboard sensors of autonomous vehicle 104.

As disclosed herein, controller 108, or a collection of controllers assigned to various sectors, may continuously monitor environmental conditions and dynamically adjust infrastructure elements 106 based on traffic flow patterns. For example, as autonomous vehicle 104 travels within a first sector (e.g., a first block within a city) a first set of sensors may transmit environmental data to controller 108 and controller 108 may dynamically adjust infrastructure items 106 within the first sector. As autonomous vehicle 104 travels to a second sector (e.g., a second block within the city), a second set of sensors may transmit environmental data to controller 108 and controller 108 may dynamically adjust infrastructure items 106 within the second sector (e.g., sector 112B). When there is no traffic within a sector controller 108 may dim lights to a preset level to save energy and minimize light pollution while still allowing some light.

The environmental data may also be transmitted to controller 108 from autonomous vehicle 104. For example, onboard photocell sensors may detect illumination levels and transmit signals to controller 108 along with standard infrastructure quality data. Controller 108 may use the environmental data in determining the infrastructure quality as disclosed above.

As disclosed herein, controller 108 may also transmit a standard infrastructure quality to autonomous vehicles. For example, after determining the infrastructure quality using the environmental data, controller 108 may transmit the standard infrastructure quality to the autonomous vehicles. The autonomous vehicles may use the standard infrastructure quality to control a level of automation authorized. For example, based on the standard infrastructure quality, the autonomous vehicles may allow full automation, driver assisted automation, or no automation at all. For instance, autonomous vehicle 104 may require X lux for full automation, Y lux for assisted automation, and below Z lux autonomous vehicle 104 may not allow any automation. If controller 108 determines the standard infrastructure quality is greater than X, the autonomous vehicle may allow fully autonomous operations.

Using the sensors 110, controller 108 may determine when autonomous vehicle 104 enters and leaves sector 112A. This can be accomplished using global positioning system (GPS) data transmitted by autonomous vehicle 104 to controller 108 and/or by monitoring illumination patterns of autonomous vehicle 104. For example, the autonomous vehicle 104 can transmit a notification to controller 108 to notify it that autonomous vehicle 104 will enter sector 112A and provide an estimated time of arrival (ETA). Autonomous vehicle 104 may also transmit a notification to controller 108 upon leaving sector 112A, which may be defined by a geofence.

Figure 2A:
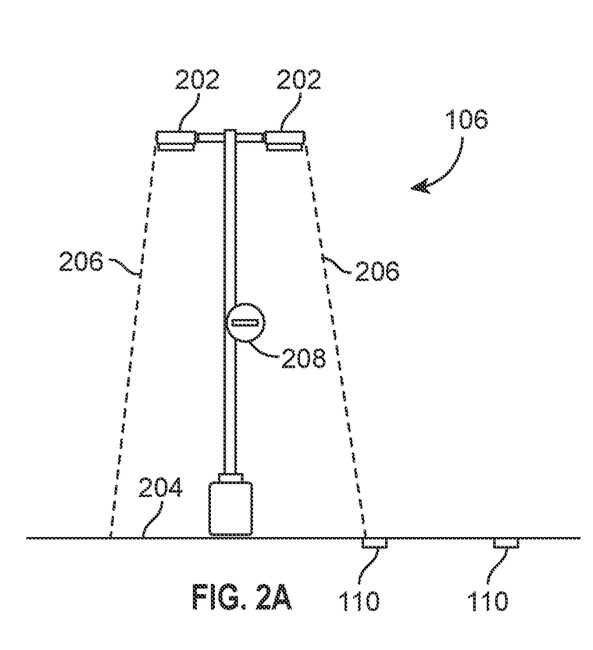
FIGS. 2A and 2B illustrate an example of an infrastructure item in accordance with at least one example of this disclosure.
Figure 2B:
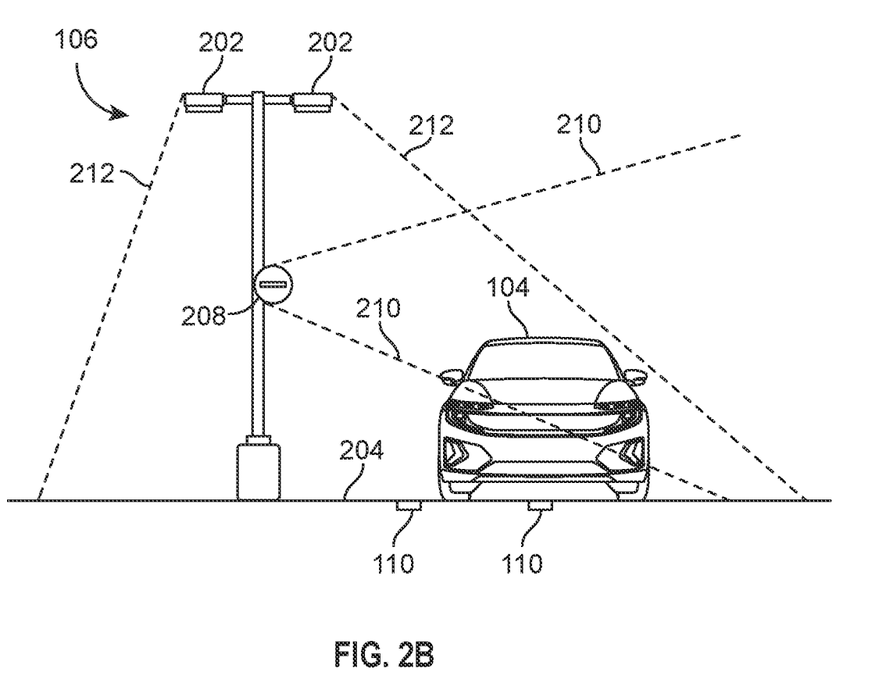

FIGS. 2A and 2B show an example of infrastructure item 106 in accordance with at least one example of this disclosure. As shown in FIG. 2A, infrastructure item 106 may be in a default configuration. The default configuration may include having lighting elements 202 illuminate a road 204 proximate infrastructure item 106 as indicated by lines 206. Infrastructure item 106 may include additional lighting element 208.

Upon determining that the quality of infrastructure effectors results in an infrastructure quality that has deviation greater than a tolerance allowed for a standard infrastructure quality, controller 108 may change a setting on lighting elements 202 and/or additional lighting element 208. For example, as shown in FIG. 2B, additional lighting element 208 may be activated to direct light over road 204 as indicated by lines 210. In addition, controller 108 may rotate a reflecting element in lighting elements 202 and/or activate additional bulbs in lighting elements 202 to cast light onto road 204 as indicated by lines 212. Once autonomous vehicle 104 is no longer proximate infrastructure element 106, infrastructure item 106 may return to a default configuration as indicated in FIG. 2A.

Figure 3:
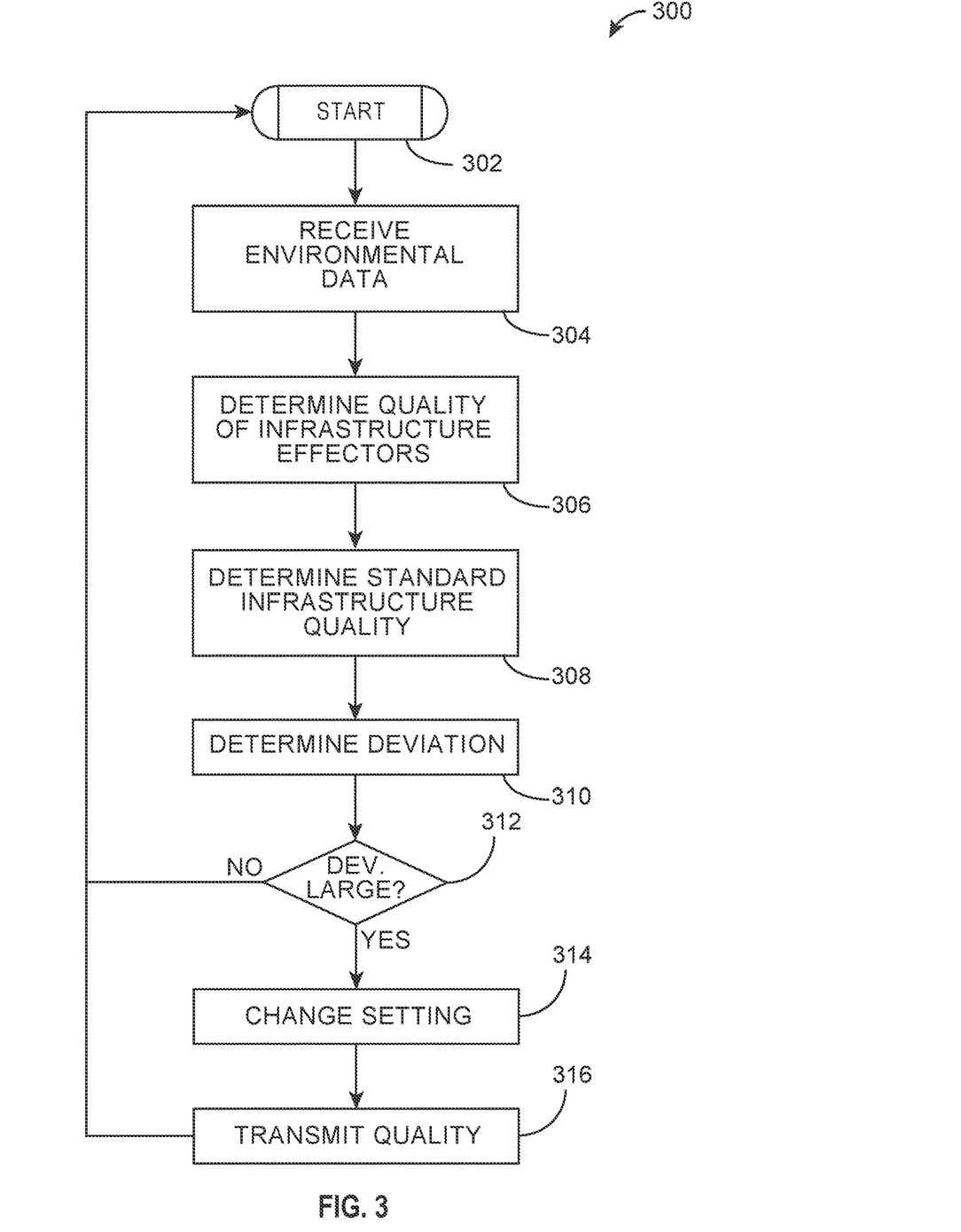
FIG. 3 illustrates an example method in accordance with at least one example of this disclosure.

FIG. 3 shows an example method 300 in accordance with at least one example of this disclosure. Method 300 may begin at starting block 302 and proceed to stage. 304 where a controller, such as controller 108, may receive environmental data. As disclosed herein, the controller may receive the environmental data from sensors located proximate infrastructure items, such as infrastructure items 106, and located throughout one or more sectors, such as sectors 112. In addition, the controller may receive environmental data from one or more autonomous vehicles, such as autonomous vehicle 104.

At stage 306, the controller may determine a quality of infrastructure effectors. For example, and as disclosed herein, the controller may use the environmental data to determine an illumination level. The controller may also determine a moisture level indicating a road may be slippery or otherwise have a reduced coefficient of static friction. Using the illumination and moisture levels the controller may also determine that the road is reflecting light increasing illumination of the infrastructure items.

At stage 308, the controller may determine a standard infrastructure quality. As disclosed herein, the controller may retrieve the standard infrastructure quality from a memory when the standard infrastructure quality is a standard set by a regulatory body.

The controller may also determine a standard infrastructure quality using data obtained from autonomous vehicles located within the sector. For example, the controller may receive as input requirements of the autonomous vehicles as disclosed herein. For example, the autonomous vehicles may transmit requirements when transmitting environmental data to the controller. The autonomous vehicles may transmit the requirements without transmitting environmental data as well. Upon receiving the illumination requirements from the autonomous vehicles, the controller may determine the ideal lumens value for sensor i using a weighted average lumens per square meter value required by autonomous vehicles in the sector using Equation 1:

$$lm_i^* = \frac{1}{n}\sum_{k=1}^{n} w_k \times req(AV_k, i) \qquad \text{Equation 1}$$

where $lm_i^*$ is the optimal value of an arbitrary light meter, i, such as sensors 110, in a surface or façade in the sector of the smart city, and $req(AV_k, i)$ is the requirement of autonomous vehicle $(AV_k)$ of n autonomous vehicles currently in the sector for that sensor i.

A weight, w, may be applied to the estimate since some autonomous vehicles might have priority over others. For example, an autonomous vehicle having a medical emergency, such as an ambulance, may have priority over non-emergency vehicles. The weighted average may put more emphasis on configurations with greater light intensity requirements.

The standard may be determined such that $lm_i^*$ is the maximum requirement among all the requirements from the autonomous vehicles as shown in Equation 2:

$$lm_i^* = \max_{a \in V}(req(a, i)) \qquad \text{Equation 2}$$

where V is the set of all autonomous vehicles currently in the sector. In other words, the controller may set the standard as the maximum illumination required for all of the autonomous vehicles in the sector to accommodate the autonomous vehicle requiring the brightest light.

Using the quality of effectors and the standard infrastructure quality, the controller may determine a deviation from the standard infrastructure quality at stage 310. As disclosed herein, the deviation may be determined by subtracting the quality of the effectors from the standard infrastructure quality. If the deviation is within a predetermined tolerance (312), method 300 may return to stage 304 to continuously monitor the quality of effectors for the sector.

If the deviation is outside the predetermined tolerance (312), method 300 may proceed to stage 314 where a setting of one or more infrastructure items located in the sector may be changed. For example, and as disclosed herein, a signal may be transmitted by the controller to the infrastructure items located in the sector to increase or decrease an intensity of light emitted by the infrastructure items. The controller may also transmit signals to activate additional lighting elements, rotate reflecting elements, etc.

After changing the setting, method 300 may proceed to stage 316 where the quality of the infrastructure effectors and/or the standard infrastructure quality may be transmitted to the autonomous vehicles in the sector. For example, the quality of the infrastructure effectors may be transmitted to the autonomous vehicles. The autonomous vehicles may use the quality of the infrastructure efforts to adjust a level of automation allowed and/or calibrate: onboard sensors.

The controller may also transmit the standard infrastructure quality that has been calculated to the autonomous vehicles. The standard infrastructure quality may act as a substitute for the quality of the infrastructure effectors. For example, once the controller adjusts the settings on the infrastructure items, the standard infrastructure quality and the quality of the infrastructure effectors may be equal. From stage 316, method 300 may return to stage 304 to continuously monitor the quality of the effectors for the sector and adjust the settings of the infrastructure items as needed.

While method 300 has been describe in a particular order, one of ordinary skill in the art will understand, in view of this disclosure, that the various stages of method 300 may be rearranged and/or omitted. For example, the controller may transmit the quality of the effectors and/or standard infrastructure quality to the autonomous vehicles (316) before changing the setting of the infrastructure items (314). In addition, the transmission of the quality of the effectors and/or standard infrastructure quality to the autonomous vehicles (316) may be omitted.

The various embodiments disclosed herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein, Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 4:
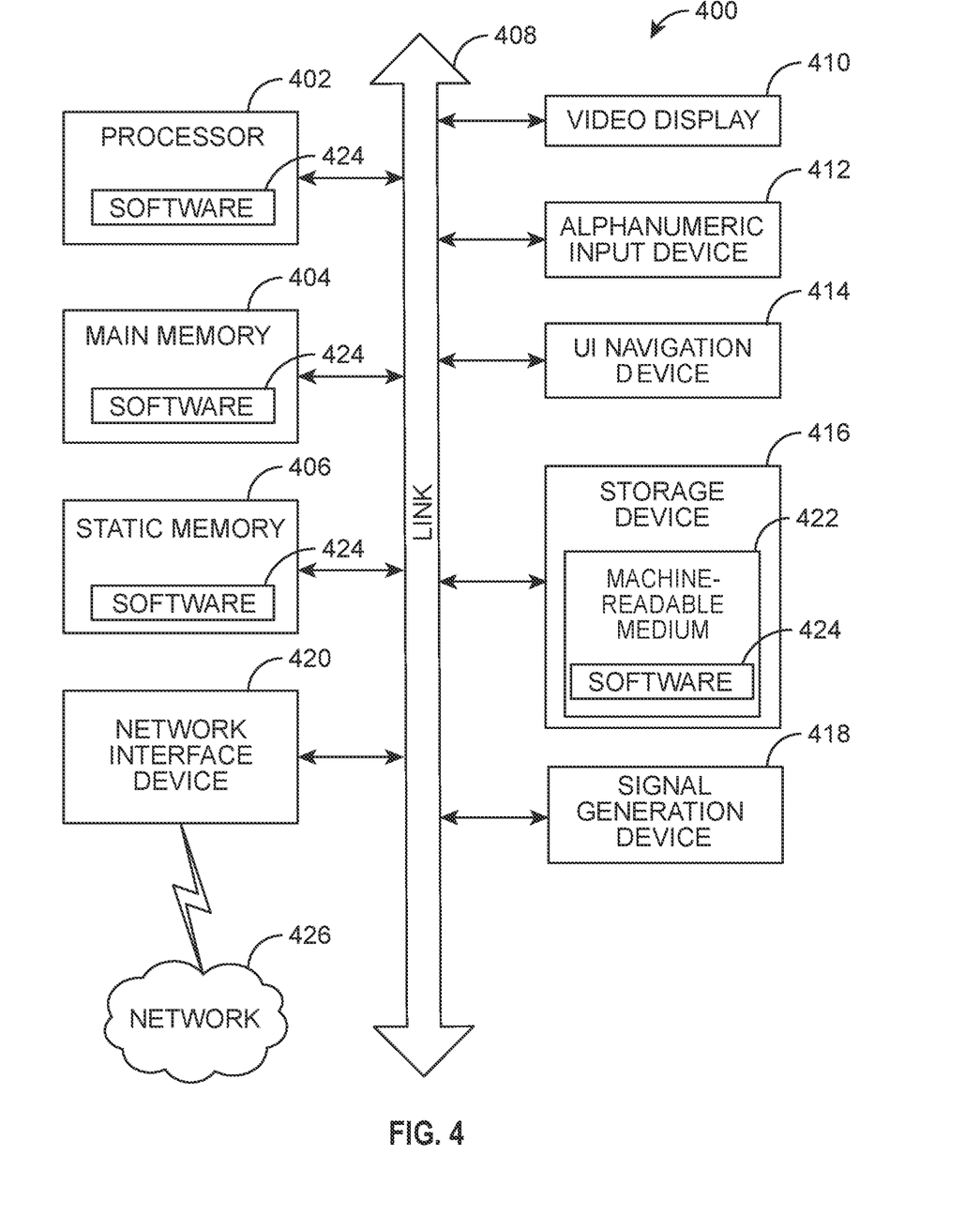
FIG. 4 illustrates a block diagram illustrating an example machine upon which any one or more of the techniques (e.g., methodologies) discussed herein may perform in accordance with at least one example of this disclosure.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 4 is a block diagram illustrating a machine in the example form of a computer system 400, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass; accelerometer, pyrometer, magnetometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM); electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or satellite communication networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES

The following, non-limiting examples, detail certain aspects of the present subject matter to solve the challenges and provide the benefits discussed herein, among others.

Example 1 is a method for dynamically adjusting an infrastructure item, the method comprising: receiving, by a computing device, environmental data for a sector containing the infrastructure item; determining, by the computing device, a quality of infrastructure effectors located within the sector; determining, by the computing device, a deviation form a standard infrastructure quality based on a comparison between the standard infrastructure quality and the infrastructure effectors; and changing, by the computing device, a setting of the infrastructure item located in the sector to minimize the deviation from the standard infrastructure quality.

In Example 2, the subject matter of Example 1 optionally includes receiving, from an autonomous vehicle, the standard infrastructure quality; and transmitting, to the autonomous vehicle, a measure of the deviation from the standard infrastructure quality.

In Example 3, the subject matter of any one or more of Examples 1-2 optionally include wherein receiving the environmental data includes receiving the environmental data from an autonomous vehicle.

In Example 4, the subject matter of any one or more of Examples 1-3 optionally include wherein receiving the environmental data includes receiving lumens readings from a plurality of light sensors associated with the infrastructure item.

In Example 5, the subject matter of any one or more of Examples 1-4 optionally include wherein receiving the environmental data includes receiving moisture readings from a plurality of moisture sensors associated with the infrastructure item.

In Example 6, the subject matter of any one or more of Examples 1-5 optionally include wherein changing the setting of the infrastructure item includes transmitting a signal to the infrastructure item, the signal operative to increase an intensity of light emitted by the infrastructure item.

In Example 7, the subject matter of any one or more of Examples 1-6 optionally include wherein changing the setting of the infrastructure item includes transmitting a signal to the infrastructure item, the signal operative to decrease an intensity of light emitted by the infrastructure item.

In Example 8, the subject matter of any one or more of Examples 1-7 optionally include wherein changing the selling of the infrastructure item includes transmitting a signal to the infrastructure item, the signal operative to reposition a lighting element of the infrastructure item.

Example 9 is the method of Example 1, wherein the infrastructure items is any one of a streetlight, curb lighting, a traffic light, construction lighting, and lighted signage, and the infrastructure effectors includes one or more control systems, switches, relays, and rheostats.

Example 10 is at least one computer-readable medium comprising instructions to perform any of the methods of Examples 1-9.

Example 11 is an apparatus comprising means for performing any of the methods of Examples 1-9.

Example 12 is a method for dynamically adjusting a plurality of infrastructure items, the method comprising: receiving, by a computing device, a plurality of infrastructure qualities from a plurality of autonomous vehicles, each of the plurality of infrastructure qualities associated with a respective one of the plurality of autonomous vehicles; determining; by the computing device; a standard infrastructure quality based on the plurality of infrastructure qualities; determining, by the computing device, a deviation from the standard infrastructure quality for each of the plurality of infrastructure qualities based on a comparison between the standard infrastructure quality and the plurality of infrastructure qualities; and changing, by the computing device, a setting of a plurality of infrastructure items to minimize the deviation from the standard infrastructure quality.

In Example 13, the subject matter of Example 12 optionally includes receiving environmental data for a sector containing the plurality of infrastructure items, the plurality of autonomous vehicles located within the sector; determining a quality of infrastructure effectors located within the sector; and transmitting the quality of infrastructure effectors to the plurality of autonomous vehicles.

In Example 14, the subject matter of Example 13 optionally includes wherein receiving the environmental data includes receiving the environmental data from the plurality of autonomous vehicles.

In Example 15, the subject matter of any one or more of Examples 13-14 optionally include wherein receiving the environmental data includes receiving lumens readings from a plurality of light sensors associated with the plurality of infrastructure items.

In Example 16, the subject matter of any one or more of Examples 13-15 optionally include wherein receiving the environmental data includes receiving moisture readings from a plurality of moisture sensors associated with the plurality of infrastructure items.

Example 17 is the method of any one of or any combination of Examples 13-16, wherein the infrastructure items is any one of a streetlight, curb lighting, a traffic light, construction lighting, and lighted signage, and the infrastructure effectors includes one or more control systems, switches, relays, and rheostats.

In Example 18, the subject matter of any one or more of Examples 12-17 optionally include wherein changing the setting of the infrastructure item includes transmitting a signal to the plurality of infrastructure items, the signal operative to increase an intensity of light emitted by at least one of the plurality of infrastructure items.

In Example 19, the subject matter of any one or more of Examples 12-18 optionally include wherein changing the setting of the plurality of infrastructure items includes transmitting a signal to at least one of the plurality of infrastructure items, the signal operative to decrease an intensity of light emitted by the at least one of the plurality of infrastructure items.

In Example 20, the subject matter of any one or more of Examples 12-19 optionally include wherein changing the setting of the plurality of infrastructure items includes transmitting a signal to at least one of the plurality of infrastructure items, the signal operative to reposition a lighting element of the at least one of the plurality of infrastructure items.

Example 21 is at least one computer-readable medium comprising instructions to perform any of the methods of Examples 12-20.

Example 22 is an apparatus comprising means for performing any of the methods of Examples 12-20.

Example 23 is a system for dynamically adjusting an infrastructure item, the system comprising: a processor; and a memory storing instructions that, when executed by the processor, cause the processor to perform actions comprising: receiving environmental data for a sector containing the infrastructure item, determining a quality of infrastructure effectors located within the sector, determining a deviation from a standard infrastructure quality based on a comparison between the standard infrastructure quality and the quality of infrastructure effectors, and changing a setting of the infrastructure item to minimize the deviation from the standard infrastructure quality.

In Example 24, the subject matter of Example 23 optionally includes wherein the instructions, when executed by the processor, cause the processor to perform further actions comprising: receiving, from an autonomous vehicle, the standard infrastructure quality; and transmitting, to the autonomous vehicle, a measure of the deviation from the infrastructure quality.

In Example 25, the subject matter of any one or more of Examples 23-24 optionally include wherein receiving the environmental data includes the instructions, when executed by the processor, causing the processor to perform further actions comprising receiving the environmental data from an autonomous vehicle.

In Example 26, the subject matter of any one or more of Examples 23-25 optionally include wherein receiving the environmental data includes the instructions, when executed by the processor, causing the processor to perform further actions comprising receiving lumens readings from a light sensor associated with the infrastructure item.

In Example 27, the subject matter of any one or more of Examples 23-26 optionally include wherein receiving the environmental data includes the instructions, when executed by the processor, causing the processor to perform further actions comprising receiving moisture readings from a moisture sensor associated with the infrastructure item.

In Example 28, the subject matter of any one or more of Examples 23-27 optionally include wherein changing the setting of the infrastructure item includes the instructions, when executed by the processor, causing the processor to perform further actions comprising transmitting a signal to the infrastructure item, the signal operative to increase an intensity of light emitted by the infrastructure item.

In Example 29, the subject matter of any one or more of Examples 23-28 optionally include wherein changing the setting of the infrastructure item includes the instructions, when executed by the processor, causing the processor to perform further actions comprising transmitting a signal to the infrastructure item, the signal operative to decrease an intensity of light emitted by the infrastructure item.

In Example 30, the subject matter of any one or more of Examples 23-29 optionally include wherein changing the setting of the infrastructure item includes the instructions, when executed by the processor, causing the processor to perform further actions comprising transmitting a signal to the infrastructure item, the signal operative to reposition a lighting element of the infrastructure item.

Example 31 is the system of any one of or any combination of Examples 23-30, wherein the infrastructure items is any one of a streetlight, curb lighting, a traffic light, construction lighting, and lighted signage, and the infrastructure effectors includes one or more control systems, switches, relays, and rheostats.

In Example 32, the subject matter of any one or more of Examples 23-31 optionally include wherein the system is a component of an autonomous vehicle.

In Example 33, the subject matter of any one or more of Examples 23-32 optionally include wherein the system is a component of the infrastructure item.

Example 34 is a system for dynamically adjusting a plurality of infrastructure items, the system comprising: a processor; and a memory storing instructions that, when executed by the processor, cause the processor to perform actions comprising: receiving a plurality of infrastructure qualities from a plurality of autonomous vehicles, each of the plurality of infrastructure qualities associated with a respective one of the plurality of autonomous vehicles, determining a standard infrastructure quality based on the plurality of infrastructure qualities, determining a deviation from the standard infrastructure quality for each of the plurality of infrastructure qualities based on a comparison of the standard infrastructure quality and the plurality of infrastructure qualities, and changing a setting of the plurality of infrastructure items to minimize the deviation from the standard infrastructure quality.

In Example 35, the subject matter of Example 34 optionally includes wherein the instructions, when executed by the processor, cause the processor to perform further actions comprising: receiving environmental data for a sector containing the plurality of infrastructure items, the plurality of autonomous vehicles located within the sector; determining a quality of infrastructure effectors located within the sector; and transmitting the quality of infrastructure effectors to the plurality of autonomous vehicles.

In Example 36, the subject matter of Example 35 optionally includes wherein receiving the environmental data includes the instructions, when executed by the processor, causing the processor to perform further actions comprising receiving the environmental data from the plurality of autonomous vehicles.

In Example 37, the subject matter of any one or more of Examples 35-36 optionally include wherein receiving the environmental data includes the instructions, when executed by the processor, causing the processor to perform further actions comprising receiving lumens readings from a plurality of light sensors associated with the plurality of infrastructure items.

Example 38 is the system of any one of or any, combination of Examples 34-37, wherein the infrastructure items is any one of a streetlight, curb lighting, a traffic light, construction lighting, and lighted signage, and the infrastructure effectors includes one or more control systems, switches, relays, and rheostats.

In Example 39, the subject matter of any one or more of Examples 35-38 optionally include wherein receiving the environmental data includes the instructions, when executed by the processor, causing the processor to perform further actions comprising receiving moisture readings from a plurality of moisture sensors associated with the plurality of infrastructure items.

In Example 40, the subject matter of any one or more of Examples 34-39 optionally include wherein changing the setting of the plurality of infrastructure items includes the instructions, when executed by the processor, causing the processor to perform further actions comprising transmitting a signal to the plurality of infrastructure items, the signal operative to increase an intensity of light emitted by at least one of the plurality of infrastructure items.

In Example 41, the subject matter of any one or more of Examples 34-40 optionally include wherein changing the setting of the plurality of infrastructure items includes the instructions, when executed by the processor, causing the processor to perform further actions comprising transmitting a signal to the plurality of infrastructure items, the signal operative to decrease an intensity of light emitted by at least one of the plurality of infrastructure items.

In Example 42, the subject matter of any one or more of Examples 34-41 optionally include wherein changing the setting of the plurality of infrastructure items includes the instructions, when executed by the processor, causing the processor to perform further actions comprising transmitting a signal to the plurality of infrastructure items, the signal operative to reposition a lighting element of at least one of the plurality of infrastructure items.

In Example 43, the subject matter of any one or more of Examples 34-42 optionally include wherein the system is a component of at least one of the plurality of autonomous vehicles.

In Example 44, the subject matter of any one or more of Examples 34-43 optionally include wherein the system is a component of at least one of the plurality of infrastructure items.

Example 45 is a system for dynamically adjusting infrastructure, the system comprising: a plurality of infrastructure items; a plurality of sensors, each of the plurality of sensors associated with at least one of the plurality of infrastructure items; and a controller in electrical communication with the plurality of infrastructure items and the plurality of sensors, the controller operative to perform actions comprising: receiving, from the plurality of sensors, environmental data for a sector containing the plurality of infrastructure items, determining a quality of infrastructure effectors located within the sector, determining a deviation from a standard infrastructure quality based on a comparison between the standard infrastructure quality and the quality of the infrastructure effectors, and changing a setting of at least one of the plurality of infrastructure items to minimize the deviation from the standard infrastructure quality.

In Example 46, the subject matter of Example 45 optionally includes wherein the controller is operative to perform additional actions comprising: receiving, from an autonomous vehicle, the standard infrastructure quality; and transmitting, to the autonomous vehicle, a measure of the deviation from the standard infrastructure quality.

In Example 47, the subject matter of any one or more of Examples 45-46 optionally include wherein receiving the environmental data includes the controller operative to perform additional actions comprising receiving the environmental data from an autonomous vehicle.

In Example 48, the subject matter of any one or more of Examples 45-47 optionally include wherein receiving the environmental data includes the controller operative to perform additional actions comprising receiving lumens readings from the plurality of sensors.

In Example 49, the subject matter of any one or more of Examples 45-48 optionally include wherein receiving the environmental data includes the controller operative to perform additional actions comprising receiving moisture readings from the plurality of sensors.

In Example 50, the subject matter of any one or more of Examples 45-49 optionally include wherein changing the setting of the at least one of the infrastructure items includes the controller operative to perform additional actions comprising transmitting a signal to the at least one of the plurality of infrastructure items, the signal operative to increase an intensity of light emitted by the at least one of the plurality of infrastructure items.

In Example 51, the subject matter of any one or more of Examples 45-50 optionally include wherein changing the setting of the at least one of the plurality of infrastructure items includes the controller operative to perform additional actions comprising transmitting a signal to the at least one of the plurality of infrastructure items, the signal operative to decrease an intensity of light emitted by the at least one of the plurality of infrastructure items.

In Example 52, the subject matter of any one or more of Examples 45-51 optionally include wherein changing the setting of the at least one of the plurality of infrastructure items includes the controller operative to perform additional actions comprising transmitting a signal to the at least one of the plurality of infrastructure items, the signal operative to reposition a lighting element of the at least one of the plurality of infrastructure items.

Example 53 is the system of any one of or any combination of Examples 45-52, wherein the infrastructure items is any one of a streetlight, curb lighting, a traffic light, construction lighting, and lighted signage, and the infrastructure effectors includes one or more control systems, switches, relays, and rheostats.

In Example 54, the subject matter of any one or more of Examples 45-53 optionally include wherein the controller is a component of an autonomous vehicle.

In Example 55, the subject matter of any one or more of Examples 45-54 optionally include wherein the controller is a component of one of the plurality of infrastructure items.

Example 56 is a system for dynamically adjusting infrastructure, the system comprising: a plurality of infrastructure items; a plurality of sensors, each of the plurality of sensors associated with at least one of the plurality of infrastructure items; and a controller in electrical communication with the plurality of infrastructure items and the plurality of sensors, the controller operative to perform actions comprising: receiving a plurality of infrastructure qualities from a plurality of autonomous vehicles, each of the plurality of infrastructure qualities associated with a respective one of a plurality of autonomous vehicles, determining a standard infrastructure quality based on the plurality of infrastructure qualities, determining a deviation from the standard infrastructure quality for each of the plurality of infrastructure qualities based on a comparison of the standard infrastructure quality and the plurality of infrastructure qualities, and changing a setting of at least one of the plurality of infrastructure items to minimize the deviation from the standard infrastructure quality.

In Example 57, the subject matter of Example 56 optionally includes wherein the controller is operative to perform additional actions comprising: receiving environmental data for a sector, the plurality of autonomous vehicles located within the sector; determining a quality of infrastructure effectors located within the sector; and transmitting the quality of infrastructure effectors to the plurality of autonomous vehicles.

In Example 58, the subject matter of Example 57 optionally includes wherein receiving the environmental data includes the controller operative to perform additional actions comprising receiving the environmental data from the plurality of autonomous vehicles.

In Example 59, the subject matter of any one or more of Examples 57-58 optionally include wherein receiving the environmental data includes the controller operative to perform additional actions comprising receiving lumens readings from the plurality of sensors.

In Example 60, the subject matter of any one or more of Examples 57-59 optionally include wherein receiving the environmental data includes the controller operative to perform additional actions comprising receiving moisture readings from the plurality of sensors.

Example 61 is the system of any one of or any combination of Examples 57-60, wherein the infrastructure items is any one of a streetlight, curb lighting, a traffic light, construction lighting, and lighted signage, and the infrastructure effectors includes one or more control systems, switches, relays, and rheostats.

In Example 62, the subject matter of any one or more of Examples 56-61 optionally include wherein changing the setting of the at least one of the plurality of infrastructure items includes the controller operative to perform additional actions comprising transmitting a signal to the at least one of the plurality of infrastructure items, the signal operative to increase an intensity of light emitted by the at least one of the plurality of infrastructure items.

In Example 63, the subject matter of any one or more of Examples 56-62 optionally include wherein changing the setting of the at least one of the plurality of infrastructure items includes the controller operative to perform additional actions comprising transmitting a signal to the at least one of the plurality of infrastructure items, the signal operative to decrease an intensity of light emitted by the at least one of the plurality of infrastructure items.

In Example 64, the subject matter of any one or more of Examples 56-63 optionally include wherein changing the setting of the at least one of the plurality of infrastructure items includes the controller operative to perform additional actions comprising transmitting a signal to the at least one of the plurality of infrastructure items, the signal operative to reposition a lighting element of the at least one of the plurality of infrastructure items.

In Example 65, the subject matter of any one or more of Examples 56-64 optionally include wherein the controller is a component of at least one of the autonomous vehicles.

In Example 66, the subject matter of any one or more of Examples 56-65 optionally include wherein the controller is a component of one of the plurality of infrastructure items.

Example 67 is a system for dynamically adjusting an infrastructure item, the system comprising: a processor; and a memory storing instructions that, when executed by the processor, cause the processor to perform actions comprising: receiving environmental data for a sector containing the infrastructure item; determining a quality of infrastructure effector located within the sector; comparing quality of a standard infrastructure and the quality of the infrastructure effector; determining a deviation from the comparison; and causing a change of a setting of the infrastructure item to reduce the deviation from the quality of the standard infrastructure.

In Example 68, the subject matter of Example 67 optionally includes wherein the instructions, when executed by the processor, cause the processor to perform further actions comprising: receiving, from an autonomous vehicle, the quality of the standard infrastructure; and transmitting, to the autonomous vehicle, a measure of the deviation from the infrastructure quality.

In Example 69, the subject matter of any one or more of Examples 67-68 optionally include wherein receiving the environmental data includes the instructions, when executed by the processor, causing the processor to perform further actions comprising receiving the environmental data from an autonomous vehicle.

In Example 70, the subject matter of any one or more of Examples 67-69 optionally include wherein receiving the environmental data includes the instructions, when executed by the processor, causing the processor to perform further actions comprising receiving lumens readings from a light sensor associated with the infrastructure item.

In Example 71, the subject matter of any one or more of Examples 67-70 optionally include wherein receiving the environmental data includes the instructions, when executed by the processor, causing the processor to perform further actions comprising receiving moisture readings from a moisture sensor associated with the infrastructure item.

In Example 72, the subject matter of any one or more of Examples 67-71 optionally include wherein causing a change of the setting of the infrastructure item includes the instructions, when executed by the processor, causing the processor to perform further actions comprising transmitting a signal to the infrastructure item, the signal operative to increase an intensity of light emitted by the infrastructure item.

In Example 73, the subject matter of any one or more of Examples 67-72 optionally include wherein causing a change of the setting of the infrastructure item includes the instructions, when executed by the processor, causing the processor to perform further actions comprising transmitting a signal to the infrastructure item, the signal operative to decrease an intensity of light emitted by the infrastructure item.

In Example 74, the subject matter of any one or more of Examples 67-73 optionally include wherein causing a change of the setting of the infrastructure item includes the instructions, when executed by the processor, causing the processor to perform further actions comprising transmitting a signal to the infrastructure item, the signal operative to reposition a lighting element of the infrastructure item.

In Example 75, the subject matter of any one or more of Examples 67-74 optionally include wherein the system is a component of an autonomous system.

In Example 76, the subject matter of any one or more of Examples 67-75 optionally include wherein the system is a component of the infrastructure item.

In Example 77, the subject matter of any one or more of Examples 67-76 optionally include wherein the infrastructure items is one of a streetlight, curb lighting, a traffic light, construction lighting, or lighted signage, and the infrastructure effectors includes one or more control systems, switches, relays, and rheostats.

Example 78 is at least one computer readable medium storing instructions that, when executed by a processor, cause the processor to perform actions comprising: receiving environmental data for a sector containing the infrastructure item; determining a quality of infrastructure effector located within the sector; comparing a quality of a standard infrastructure and the quality of the infrastructure effector; determining a deviation from the comparison; and causing a change of a setting of the infrastructure item to reduce the deviation from the quality of the standard infrastructure.

In Example 79, the subject matter of Example 78 optionally includes wherein the instructions, when executed by the processor, cause the processor to perform further actions comprising: receiving, from an autonomous vehicle, the quality of the standard infrastructure; and transmitting, to the autonomous vehicle, a measure of the deviation from the infrastructure quality.

In Example 80, the subject matter of any one or more of Examples 78-79 optionally include wherein receiving the environmental data includes the instructions, when executed by the processor, causing the processor to perform further actions comprising receiving lumens readings from a light sensor associated with the infrastructure item.

In Example 81, the subject matter of any one or more of Examples 78-80 optionally include wherein causing a change of the setting of the infrastructure item includes the instructions, when executed by the processor, causing the processor to perform further actions comprising transmitting a signal to the infrastructure item, the signal operative to increase an intensity of light emitted by the infrastructure item.

In Example 82, the subject matter of any one or more of Examples 78-81 optionally include wherein causing a change of the setting of the infrastructure item includes the instructions, when executed by the processor, causing the processor to perform further actions comprising transmitting a signal to the infrastructure item, the signal operative to decrease an intensity of light emitted by the infrastructure item.

In Example 83, the subject matter of any one or more of Examples 78-82 optionally include wherein causing a change of the setting of the infrastructure item includes the instructions, when executed by the processor, causing the processor to perform further actions comprising transmitting a signal to the infrastructure item, the signal operative to reposition a lighting element of the infrastructure item.

In Example 84, the subject matter of any one or more of Examples 78-83 optionally include wherein the infrastructure items is one of a streetlight, curb lighting, a traffic light, construction lighting, or lighted signage, and the infrastructure effectors includes one or more control systems, switches, relays, and rheostats.

Example 85 is a control system for dynamically adjusting infrastructure, the system comprising: a plurality of infrastructure items; a plurality of sensors, each of the plurality of sensors associated with at least one of the plurality of infrastructure items; and a controller in electrical communication with the plurality of infrastructure items and the plurality of sensors, the controller operative to perform actions comprising: receiving, from the plurality of sensors, environmental data for a sector containing the plurality of infrastructure items, determining a quality of infrastructure effectors located within the sector, comparing quality of a standard infrastructure and the quality of the infrastructure effector, determining a deviation from the comparison, and causing a change of a setting of at least one of the plurality of infrastructure items to reduce the deviation from the quality of the standard infrastructure.

In Example 86, the subject matter of Example 85 optionally includes wherein the controller is operative to perform additional actions comprising: receiving, from an autonomous system, the quality of the standard infrastructure; and transmitting, to the autonomous system, a measure of the deviation from the standard infrastructure quality.

In Example 87, the subject matter of any one or more of Examples 85-86 optionally include wherein receiving the environmental data includes the controller operative to perform additional actions comprising receiving lumens readings from the plurality of sensors.

In Example 88, the subject matter of any one or more of Examples 85-87 optionally include wherein receiving the environmental data includes the controller operative to perform additional actions comprising receiving moisture readings from the plurality of sensors.

In Example 89, the subject matter of any one or more of Examples 85-88 optionally include wherein causing a change of the setting of the at least one of the infrastructure items includes the controller operative to perform additional actions comprising transmitting a signal to the at least one of the plurality of infrastructure items, the signal operative to increase an intensity of light emitted by the at least one of the plurality of infrastructure items.

In Example 90, the subject matter of any one or more of Examples 85-89 optionally include wherein causing a change of the setting of the at least one of the plurality of infrastructure items includes the controller operative to perform additional actions comprising transmitting a signal to the at least one of the plurality of infrastructure items, the signal operative to reposition a lighting element of the at least one of the plurality of infrastructure items.

In Example 91, the subject matter of any one or more of Examples 85-90 optionally include wherein the infrastructure items is any one of a streetlight, curb lighting, a traffic light, construction lighting, and lighted signage, and the infrastructure effectors includes one or more control systems, switches, relays, and rheostats.

In Example 92, the apparatuses or method of any one or any combination of Examples 1-91 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment, Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system of an autonomous vehicle for dynamically adjusting an infrastructure item, the system comprising:
    a processor; and
    a memory storing instructions that, when executed by the processor, cause the processor to perform actions comprising:
        receiving environmental data for a sector containing the infrastructure item, the environmental data collected from the autonomous vehicle or another autonomous vehicle during operation in the sector;
        determining, based on the environmental data, a quality of an infrastructure effector located within the sector, wherein the infrastructure effector controls one or more effects of the infrastructure item;
        performing a comparison between a quality of a standard infrastructure item and the quality of the infrastructure effector;
        determining a deviation from the comparison; and
        causing a change of a setting of the infrastructure item to reduce the deviation from the quality of the standard infrastructure item.

2. The system of claim 1, wherein the instructions, when executed by the processor, cause the processor to perform further actions comprising:
    receiving, from the another autonomous vehicle, the quality of the standard infrastructure item; and
    transmitting, to the another autonomous vehicle, a measure of the deviation from the infrastructure quality.

3. The system of claim 1, wherein receiving the environmental data includes the instructions, when executed by the processor, causing the processor to perform further actions comprising receiving the environmental data from the another autonomous vehicle.

4. The system of claim 1, wherein receiving the environmental data includes the instructions, when executed by the processor, causing the processor to perform further actions comprising receiving lumens readings from a light sensor associated with the infrastructure item.

5. The system of claim 1, wherein receiving the environmental data includes the instructions, when executed by the processor, causing the processor to perform further actions comprising receiving moisture readings from a moisture sensor associated with the infrastructure item.

6. The system of claim 1, wherein causing a change of the setting of the infrastructure item includes the instructions, when executed by the processor, causing the processor to perform further actions comprising transmitting a signal to the infrastructure item, the signal operative to increase an intensity of light emitted by the infrastructure item.

7. The system of claim 1, wherein causing a change of the setting of the infrastructure item includes the instructions, when executed by the processor, causing the processor to perform further actions comprising transmitting a signal to the infrastructure item, the signal operative to decrease an intensity of light emitted by the infrastructure item.

8. The system of claim 1, wherein causing a change of the setting of the infrastructure item includes the instructions, when executed by the processor, causing the processor to perform further actions comprising transmitting a signal to the infrastructure item, the signal operative to reposition a lighting element of the infrastructure item.

9. The system of claim 1, wherein the infrastructure items is one of a streetlight, curb lighting, a traffic light, construction lighting, or lighted signage, and
    wherein the infrastructure effectors includes one or more control systems, switches, relays, and rheostats.

10. At least one non-transitory computer readable medium storing instructions that, when executed by a processor of a control system for an autonomous system, cause the processor to perform actions comprising:
    receiving environmental data for a sector containing an infrastructure item, the environmental data collected from the autonomous system or another autonomous system;
    determining, based on the environmental data, a quality of infrastructure effector located within the sector, wherein the infrastructure effector controls one or more effects of the infrastructure item;
    performing a comparison between a quality of a standard infrastructure item and the quality of the infrastructure effector;
    determining a deviation from the comparison; and
    causing a change of a setting of the infrastructure item to reduce the deviation from the quality of the standard infrastructure item.

11. The at least one non-transitory computer readable medium of claim 10, wherein the instructions, when executed by the processor, cause the processor to perform further actions comprising:
    receiving, from an autonomous vehicle, the quality of the standard infrastructure item; and
    transmitting, to the autonomous vehicle, a measure of the deviation from the infrastructure quality.

12. The at least one non-transitory computer readable medium of claim 10, wherein receiving the environmental data includes the instructions, when executed by the processor, causing the processor to perform further actions comprising receiving lumens readings from a light sensor associated with the infrastructure item.

13. The at least one non-transitory computer readable medium of claim 10, wherein causing a change of the setting of the infrastructure item includes the instructions, when executed by the processor, causing the processor to perform further actions comprising transmitting a signal to the infrastructure item, the signal operative to increase an intensity of light emitted by the infrastructure item.

14. The at least one non-transitory computer readable medium of claim 10, wherein causing a change of the setting of the infrastructure item includes the instructions, when executed by the processor, causing the processor to perform further actions comprising transmitting a signal to the infrastructure item, the signal operative to decrease an intensity of light emitted by the infrastructure item.

15. The at least one non-transitory computer readable medium of claim 10, wherein causing a change of the setting of the infrastructure item includes the instructions, when executed by the processor, causing the processor to perform further actions comprising transmitting a signal to the infrastructure item, the signal operative to reposition a lighting element of the infrastructure item.

16. The at least one non-transitory computer readable medium of claim 10, wherein the infrastructure items is one of a streetlight, curb lighting, a traffic light, construction lighting, or lighted signage, and the infrastructure effectors includes one or more control systems, switches, relays, and rheostats.

17. A control system of an autonomous system for dynamically adjusting infrastructure, the control system comprising:

a plurality of sensors, each of the plurality of sensors associated with at least one of a plurality of infrastructure items; and a controller in communication with the plurality of infrastructure items and the plurality of sensors, the controller operative to perform actions comprising:

receiving, from the plurality of sensors, environmental data for a sector containing the plurality of infrastructure items, determining, based on the environmental data, a quality of infrastructure effectors located within the sector, wherein the infrastructure effector controls one or more effects of the infrastructure item, performing a comparison between a quality of a standard infrastructure item and the quality of the infrastructure effector, determining a deviation from the comparison, and causing a change of a setting of at least one of the plurality of infrastructure items to reduce the deviation from the quality of the standard infrastructure item.

18. The system of claim 17, wherein the controller is operative to perform additional actions comprising:

receiving, from another autonomous system, the quality of the standard infrastructure item; and transmitting, to the another autonomous system, a measure of the deviation from the quality of the standard infrastructure.

19. The system of claim 17, wherein receiving the environmental data includes the controller operative to perform additional actions comprising receiving lumens readings from the plurality of sensors.

20. The system of claim 17, wherein receiving the environmental data includes the controller operative to perform additional actions comprising receiving moisture readings from the plurality of sensors.

21. The system of claim 17, wherein causing a change of the setting of the at least one of the infrastructure items includes the controller operative to perform additional actions comprising transmitting a signal to the at least one of the plurality of infrastructure items, the signal operative to increase an intensity of light emitted by the at least one of the plurality of infrastructure items.

22. The system of claim 17, wherein causing a change of the setting of the at least one of the plurality of infrastructure items includes the controller operative to perform additional actions comprising transmitting a signal to the at least one of the plurality of infrastructure items, the signal operative to reposition a lighting element of the at least one of the plurality of infrastructure items.

23. The system of claim 17, wherein the infrastructure items is any one of a streetlight, curb lighting, a traffic light, construction lighting, and lighted signage, and the infrastructure effectors includes one or more control systems, switches, relays, and rheostats.

* * * * *